United States Patent
Beaman et al.

(10) Patent No.: US 12,055,961 B2
(45) Date of Patent: Aug. 6, 2024

(54) LEVEL CONTROL SYSTEM FOR A LIQUID FILLED BASIN

(71) Applicant: Ovivo Inc., Montreal (CA)

(72) Inventors: Tyson Beaman, Murray, UT (US); Garret Beaman, Murray, UT (US); John Vorwaller, Salt Lake City, UT (US)

(73) Assignee: Ovivo Inc., Montreal (CA)

( * ) Notice: Subject to any disclaimer, the term of this patent is extended or adjusted under 35 U.S.C. 154(b) by 0 days.

(21) Appl. No.: 17/454,460

(22) Filed: Nov. 10, 2021

(65) Prior Publication Data

US 2022/0075397 A1 Mar. 10, 2022

Related U.S. Application Data

(63) Continuation-in-part of application No. 17/280,771, filed as application No. PCT/US2019/053677 on Sep. 27, 2019, now Pat. No. 11,479,943.

(60) Provisional application No. 62/757,459, filed on Nov. 8, 2018, provisional application No. 62/738,974, filed on Sep. 28, 2018.

(51) Int. Cl.
*G05D 9/02* (2006.01)

(52) U.S. Cl.
CPC ..................... *G05D 9/02* (2013.01)

(58) Field of Classification Search
CPC ...... F16K 15/03; F16K 15/031; F16K 15/034; F16K 31/22; G05D 9/02; B01D 21/2444
See application file for complete search history.

(56) References Cited

U.S. PATENT DOCUMENTS

| | | | |
|---|---|---|---|
| 616,252 A * | 12/1898 | Pennie | F16K 15/03 251/367 |
| 1,324,515 A * | 12/1919 | Otti | F16K 15/03 251/303 |
| 2,168,177 A | 8/1939 | Danel | |
| 3,217,497 A | 11/1965 | Humpherys et al. | |
| 3,695,043 A | 10/1972 | Vallet | |
| 3,783,893 A * | 1/1974 | Davison | F16K 15/03 251/303 |

(Continued)

FOREIGN PATENT DOCUMENTS

| CN | 100455859 C * | 1/2009 | ............ F16K 15/03 |
|---|---|---|---|
| DE | 3937685 A1 | 5/1991 | |

(Continued)

OTHER PUBLICATIONS

Machine English translation of CN100455859C (Year: 2022).*
Machine English translation of DE-102009025388-A1 (Year: 2022).*

*Primary Examiner* — Hailey K. Do
(74) *Attorney, Agent, or Firm* — Thomas M. Freiburger

(57) ABSTRACT

A liquid level control system employs a flap gate for discharging liquid, but with a midstream headloss inducing device between the basin or tank and the flap gate. The flap gate opens when liquid level in the basin rises, and the opening of the gate is controlled by a counterweight positioned so as to decrease closing force as the gate opens farther, thus managing the outflow of liquid to efficiently return the basin to a design level. If flow from the basin is generally constant, the system will reach a point of equilibrium of gate opening and closing forces while liquid flows out from the basin.

8 Claims, 5 Drawing Sheets

100% FLOW OPENED
(SEL HIDDEN FOR CLARITY)

(56) References Cited

U.S. PATENT DOCUMENTS

| | | | | |
|---|---|---|---|---|
| 3,955,596 | A | * | 5/1976 | Diaz ........................ F16K 15/03 |
| | | | | 137/550 |
| 4,353,390 | A | * | 10/1982 | Karpenko ........... F16K 37/0008 |
| | | | | 251/63.4 |
| 4,502,503 | A | * | 3/1985 | Karpenko ............... F16K 15/03 |
| | | | | 137/527.8 |
| 5,552,050 | A | * | 9/1996 | Valentin ............. B01D 21/2444 |
| | | | | 210/540 |
| 6,663,318 | B2 | * | 12/2003 | Kezele ................. G05D 7/0173 |
| | | | | 405/87 |
| 9,919,244 | B2 | | 3/2018 | Heimdal et al. |
| 2009/0008588 | A1 | * | 1/2009 | Giehl ........................ E03F 7/04 |
| | | | | 251/157 |

FOREIGN PATENT DOCUMENTS

| | | | | |
|---|---|---|---|---|
| DE | 102009025388 A1 | * | 6/2010 | ......... B01D 21/2444 |
| GB | 191218715 A | * | 2/1913 | |

* cited by examiner

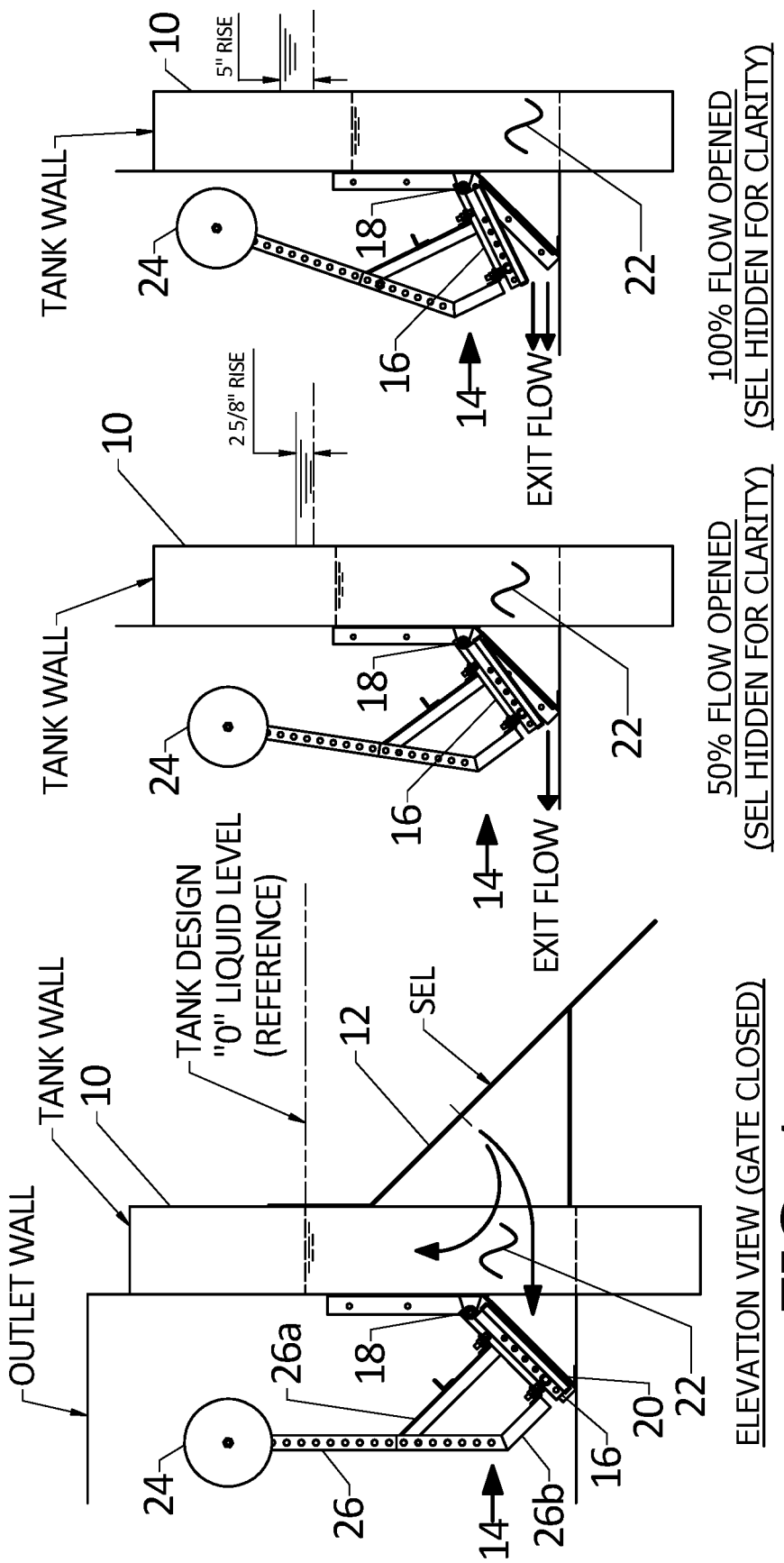

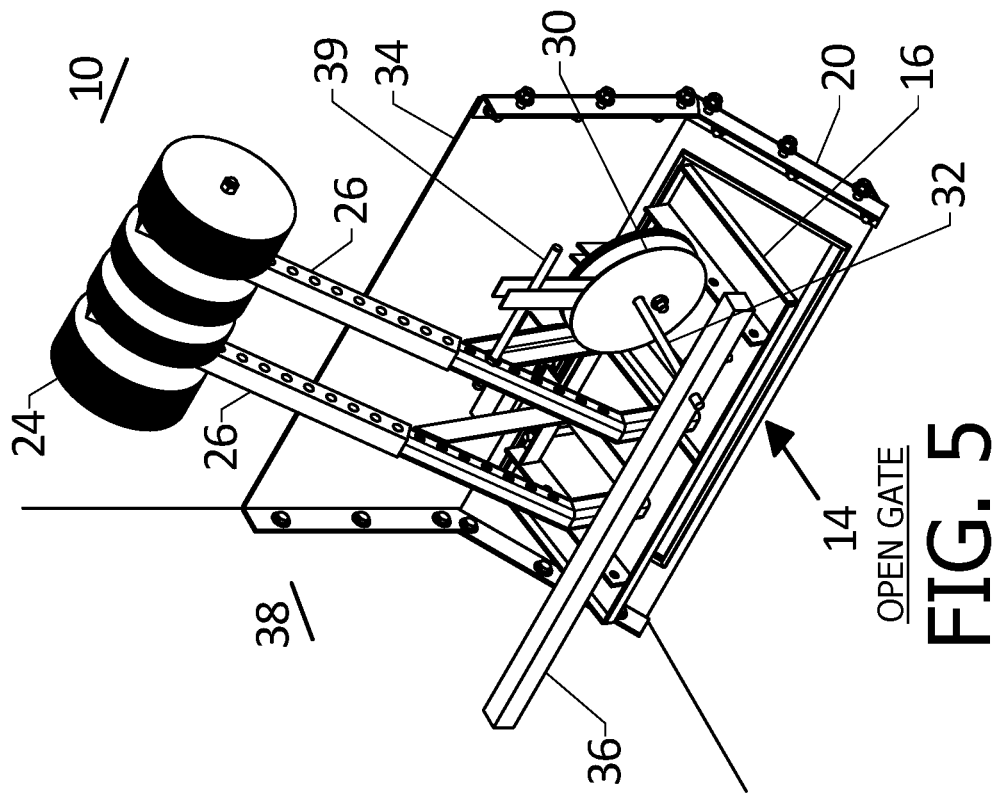
FIG. 5 OPEN GATE
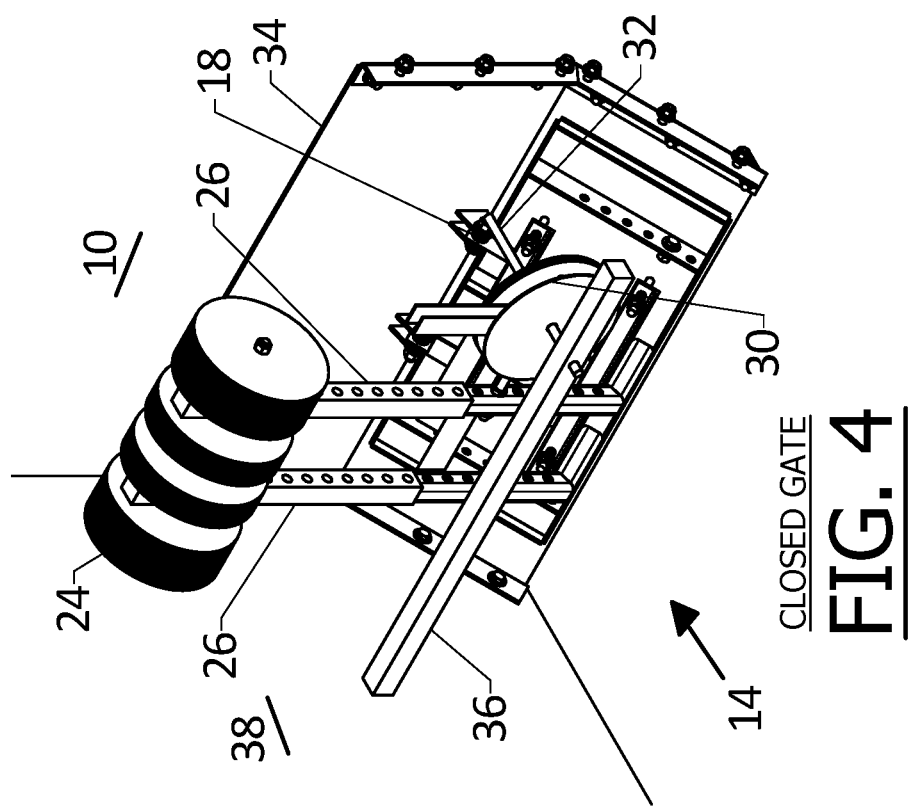
FIG. 4 CLOSED GATE

ELEVATION VIEW (GATE OPENED)

ISOMETRIC VIEW
CLOSED GATE

LEVEL CONTROL SYSTEM FOR A LIQUID FILLED BASIN

This application is a continuation-in-part of application Ser. No. 17/280,771, filed Mar. 26, 2021, which claimed benefit of provisional application Ser. No. 62/738,974, filed Sep. 28, 2018 and 62/757,459, filed Nov. 8, 2018, as well as international application No. PCT/US2019/053677, published as WO/2020/069457, filed Sep. 27, 2019. The disclosure of publication No. WO/2020/069457 is incorporated herein by reference as to the specific embodiments there described, some of which include a basin level-responsive actuator as a part of gate control.

BACKGROUND OF THE INVENTION

This invention concerns control of liquid level in a basin or tank, by controlling flow out from the basin. In one application the basin or vessel is a clarifier in a sewage treatment plant.

In absence of an overflow weir, a midstream device is needed to equally distribute flow from a clarifier. The problem with conventional liquid level control systems today is that they cannot efficiently handle non-linear changes due to head losses through an interconnecting system or midstream device without some type of electrical controls, which can be expensive and can potentially create problems if an electrical outage occurs. In many cases a simple overflow weir is not possible or desired.

SUMMARY OF THE INVENTION

The current invention is a mechanical liquid level control system configured such that regardless of changes in the flow rate into and from the basin, even sudden surges of flow, the liquid level can be controlled and managed within a set of desired parameters. In the system is an intermediate headloss device, which can be, for example, a submerged effluent launder in a clarifier of a sewage treatment plant, withdrawing liquid from below the surface. A flap gate is positioned downstream of the submerged effluent launder or other headloss device. The closing force on the flap gate, which is on a horizontal hinge axis, is exerted by the weight of the flap itself and by a counterweight or counterforce attached to control the flap gate opening and closing, so that a controlled outflow of water is maintained under all conditions, preventing flushing or surging of water out of the basin or vessel. Unlike embodiments described in application Ser. No. 17/280,771, additional embodiments of the current invention do not employ a float or other mechanical device directly responsive to the change of liquid level in the basin. Still the invention can maintain a minimal, acceptable range of liquid level variation, the level variation depending on basin inflow variations.

In a preferred embodiment of the invention a counterweight is attached via an arm to the flap gate. The counterweight at the end of the arm is positioned such that as the gate opens, the counterweight exerts less closing moment on the gate. The arm typically will place the counterweight at a position outward and upward from the flap gate. Thus, when the gate is closed the counterweight is in a position angled upwardly/forwardly above the gate, which may be approximately above the opening end of the gate, to provide maximum closing moment exerted by the counterweight. Sufficient head in a chamber of the intermediate headloss device, caused by a rise in the liquid level in the main basin, will cause the gate flap to initially open. The continued flow can then push the flap to open farther, with the counterweight moving back toward the hinge, so that less closure force is exerted by the counterweight as the flap continues to open. The counterweight can travel to a position almost vertically above the gate hinge, at which point it has neither an opening nor a closing effect (any further weight movement would tend to slightly assist opening of the gate, which is undesirable in most cases). As outflow increases, the headloss attributed to increase in flow through the intermediate headloss device will increase (thereby decreasing the opening force on the gate), allowing equilibrium to be met by balancing the decreased closure force (counterweight) and the decreased opening force. Note that flow through the SEL (headloss device) is governed by the level of liquid in the chamber. An empty chamber would produce maximum flow rate through the SEL to fill the chamber. Conversely, when chamber level equals basin level, zero flow occurs.

As the liquid level in the tank or basin decreases due to reduced inflow to the basin, the chamber level will also fall initially because the gate is open, and hydraulic head acting on the headloss device has lessened. The reduced chamber head (which lessens the gate opening force) will allow the gate to begin moving toward closure thereby causing the counterweight to increase in applied closure moment, and the head in the intermediate device increases (headloss decreases). The gate continues to move toward closure. If a substantially constant inflow of liquid to the basin occurs for a time, the gate can find equilibrium at a partially open position and the basin liquid will be slightly above design level.

The system typically will prevent flushing or undulation through the gate, wherein liquid flow drops quickly in the intermediate zone, the gate drops to nearly closed, the liquid rises again quickly in the intermediate zone, quickly opening the flap and flushing, and so on. An optional dampening device can be included to assure this does not occur. In addition, the travel distance of the counterweight, and thus of the gate flap, can be limited, so that a maximum opening of the gate is defined.

DESCRIPTION OF THE DRAWINGS

FIG. 1 is a schematic side elevation view indicating the liquid level control system of the invention, with a flap valve fully closed.

FIG. 2 is a similar side elevation view, somewhat simplified, with the flap valve slightly open.

FIG. 3 is another similar view, showing the flap valve at a more widely open position, which can be a fully open position.

FIG. 4 is a perspective view showing an implementation of the invention in one embodiment, with the flap valve closed and illustrating the dampening device.

FIG. 5 is a similar perspective view, with the flap valve in a fully open position and illustrating the dampening device.

DESCRIPTION OF PREFERRED EMBODIMENTS

Figure 7:
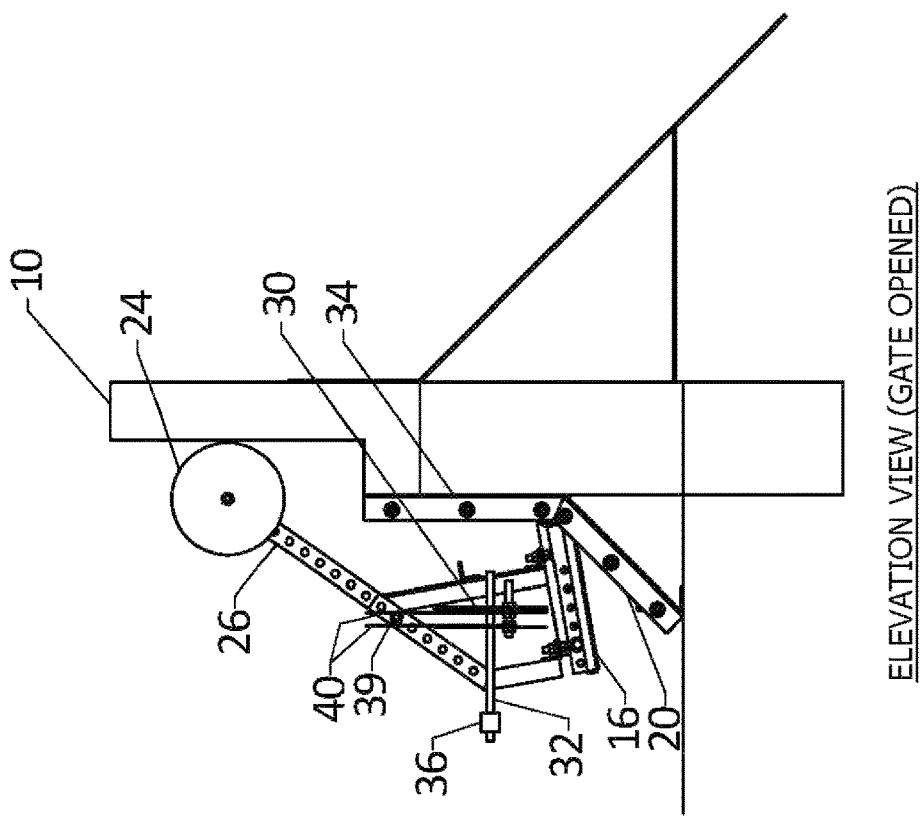
FIG. 7 is a side view with the gate valve open and illustrating the dampening device.
Figure 6:
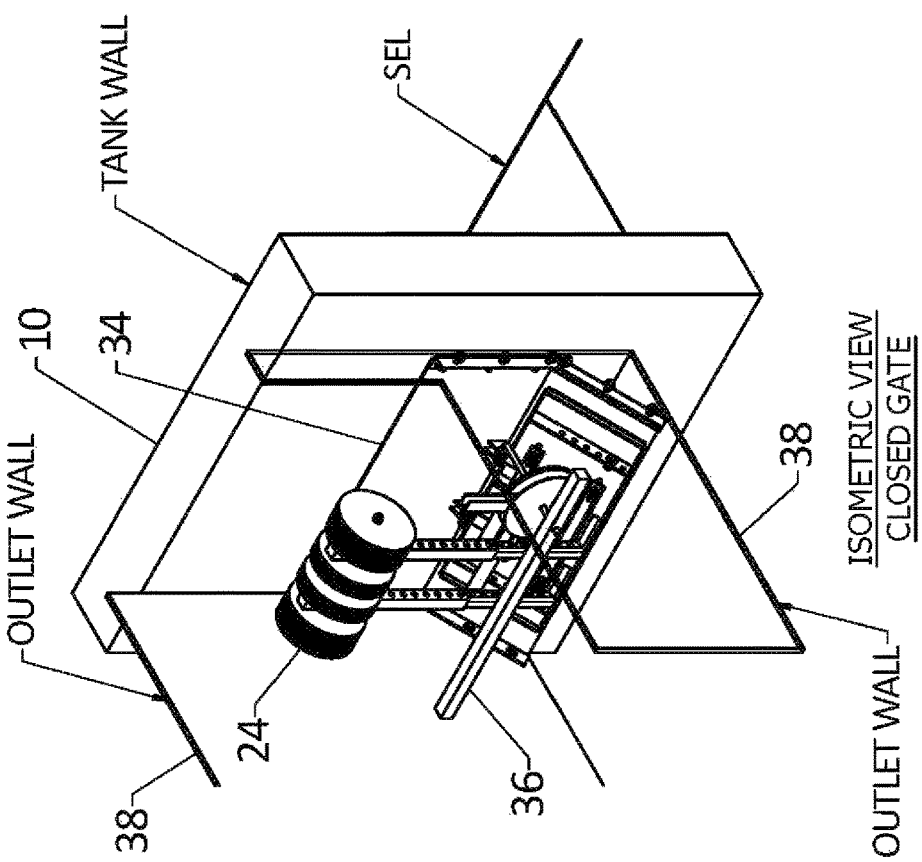
FIG. 6 is another perspective view, showing the flap gate closed and illustrating the dampening device.

In the drawings FIG. 1 shows the tank or basin liquid level at design level, noted as zero. The basin wall is shown at 10.

A submerged effluent launder (SEL) is indicated at 12, which can be similar to that shown in U.S. Pat. No. 9,919,244, withdrawing basin liquid from below the surface via a multiplicity of small openings. The SEL 12 is shown in FIG. 1 (but not in FIGS. 2 and 3, for clarity), and liquid is nearly always flowing into the SEL. The SEL is a headloss inducing device, in that it has submerged apertures that can only receive liquid at a limited rate. The SEL acts as a "choke" on the flow out of the tank. Higher head directly upstream of the SEL will naturally increase flow into the SEL, and vice versa but to a limited extent.

Liquid collected in the SEL flows to a flap gate 14 that has a gate flap 16 hinged at 18 to fixed structure on the wall 10 and which closes against a valve closure seat 20. In FIGS. 1 to 3 an intermediate chamber 22 is shown between the SEL and the gate, and its level is a part of the function of the system.

The design liquid level is actually defined by the weight 24 acting on the flap gate 14. The design level is that level, which if no SEL were present, will just start to cause initial opening of the flap gate. If additional weight were placed on the flap gate the design liquid level would be increased.

Due to slight rises in the tank liquid level, water has been flowing through the SEL and into the chamber 22 back of the flap gate. If inflow to the basin stopped the chamber and basin would both assume design level as the gate would be closed. The flap gate only opens when the basin and chamber rise above the tank design liquid level. Obviously the level in that chamber can never exceed that of the tank. The total weight acting on the flap is such that once the intermediate chamber level rises above design level, the gate will start to open. At that point the opening moments acting on the flap gate will exceed the threshold causing the gate flap to open. Once the gate opens the chamber level will fall.

The design of the gate control is such as to decrease the closing moment on the gate as the gate opens. For this purpose the cantilevered counterweight 24 is fixedly attached to the gate flap 16 by an arm 26, which can be via struts 26a and 26b. The counterweight 24 is positioned to decrease closing moment as the flap progresses open. The reason for this is to allow the gate to open farther once flow begins and the flap opens somewhat. This allows a greater flow out of the intermediate chamber than would otherwise be the case, so that the system is more responsive and equilibrium in inflow and outflow is reached more efficiently, and such that the variation in tank level is minimized. The gate thus opens farther than would be the case if a constant closing force were exerted on the gate, putting better control on the liquid level in the main tank by responding more effectively and efficiently to changes in level in the headloss inducing device (e.g. SEL).

FIG. 2 shows the system with the flap open somewhat (assumed at 50%). As illustrated, the counterweight 24 has moved toward the tank wall, i.e. in the generally horizontal direction toward the flap hinge 18 (toward a vertical plane containing the flap hinge), lessening the closing force and moment exerted by the counterweight. In the illustrated example the tank level has risen 2⅝" above design level. The liquid level in the chamber has decreased to somewhat lower than the original tank design liquid level. This can be assumed to be a condition of equilibrium of closing and opening moments on the gate, and the gate will remain at that open position, with the basin level at the same rise, as long as inflow to the basin remains constant.

As the gate opens from the FIG. 1 position and liquid begins to evacuate through the intermediate chamber 22, which decreases the liquid level of the chamber, the level in the tank initially will continue rising due to the significant headloss inducing device. When the intermediate chamber liquid level falls to a certain point, perhaps several inches below design liquid level for the tank, the gate reaches equilibrium between opening and closing forces and the gate flap remains stable, as in FIG. 2. When the tank level decreases and the chamber level decreases slightly in parallel, the opening force decreases such that the closure force overcomes the opening force causing the gate to close somewhat, until again finding equilibrium.

Note that equilibrium can only be attained when inflow rate to the basin becomes constant. When the inflow rate drops to a new level and the basin level is still above design level, a new point of equilibrium can be reached with the gate open to a lesser degree.

In FIG. 3, showing maximum projected exit flow and with the flap 16 shown in a fully open position, the rise in basin level is shown as approximately five inches. This five inch change in water level has been determined by experimentation and calibration based on design of the headloss inducing device and the design liquid output requirement for a particular situation. The water level change can be less in a situation with low variations in basin inflow, or a headloss inducing device which produces less headloss than this particular situation. Note that the rate at which liquid level in the basin rises is normally not a factor, although the maximum variation in inflow can be a design factor. Even a sudden surge of flow rate into the basin will cause only a small rise in basin level and that is subject to the choking effect of the intermediate headloss device (e.g. SEL). If increases in rate of flow remain within design parameters, rises in the basin should not exceed about five inches.

Behavior of the gate and liquid levels in moving toward closure is opposite that in gate opening. The basin level starts to fall, which causes initially a parallel drop in chamber 22 level. That causes the flap gate to move toward closure, causing chamber liquid level to rise and increasing closure moment on the gate. If basin level continues to fall, chamber level will rise, to meet basin level as design level is reached, and the flap closes.

There can be a problem with undulation, which is a sort of repeated flushing through the gate, wherein liquid flow drops quickly in the intermediate zone, the gate drops to nearly closed, the liquid rises again quickly in the intermediate zone, flushing occurs, etc. A dampening device can be included to limit this movement, as described below and indicated in FIGS. 4-7. Also, the distance the counterweight can travel can be limited, so that a maximum opening of the gate is defined.

FIGS. 4, 5, 6 and 7 are perspective and side elevation schematic views showing an embodiment of the mechanical level control system of the invention. Only the flap valve assembly is shown, as secured against a wall 10 of a basin or tank, and an intermediate liquid chamber, not shown, is immediately adjacent to the upstream side of the valve 14, either in the wall or on the other side of the wall, just downstream of and connected to the submerged effluent launder (SEL) 12 which is shown in FIG. 1. The counterweight is shown at 24, which refers collectively to what can be a series of weights as shown in the drawing. The cantilevered supporting arm 26 is indicated as a pair of parallel arms, connected to the gate flap 16 as shown and discussed above. FIG. 4 shows the flap in closed position, while FIG. 5 shows it in what can be considered a fully open position.

The width of the flap valve opening is selected according to the design flow rate associated with the basin it serves. The anticipated volumetric flow is accommodated by the proper width of this opening.

As mentioned above, an undulation of the valve flap 16 can occur under some conditions, wherein the flap moves open and then toward closure repeatedly in an undulating, repeated flushing effect. This can be addressed with an appropriate form of dampening device, one of which is seen in FIGS. 4 to 7. A weight 30 can be provided, slidable back and forth on a rod 32 in response to opening and closing of the gate. One example of a mechanical arrangement is shown in these drawings, in which the rod 32 remains essentially horizontal, being fixedly mounted at one end on a back plate/hinge support 34 of the valve assembly, and the other on a structural member 36 secured to other fixed structure such as fixed outlet compartment walls 38 (FIG. 6), not movable with the flap. A flap movement follower rod 39 is secured to the arm 26 and, although it moves in an arcuate path, it engages between guide plates or bars 40 connected to the weight 30 such that the motion of the weight 30 is only horizontal (linear).

If the flap tends to undulate, the slidable weight 30 will dampen this undulation by frictional resistance of the weight 30 sliding on the rod, as well as by its mass giving resistance against sudden accelerations. Thus, if the flap 16 would tend to slam shut, it will have to move the mass 30 along with it; the sliding friction and the inertia of the mass will resist such rapid accelerations.

The dampening device shown in the drawings is only one example. Effective devices could be a pneumatic piston/cylinder as on a door closer, a shock absorber or other mechanical, pneumatic or hydraulic device.

Figure 8:
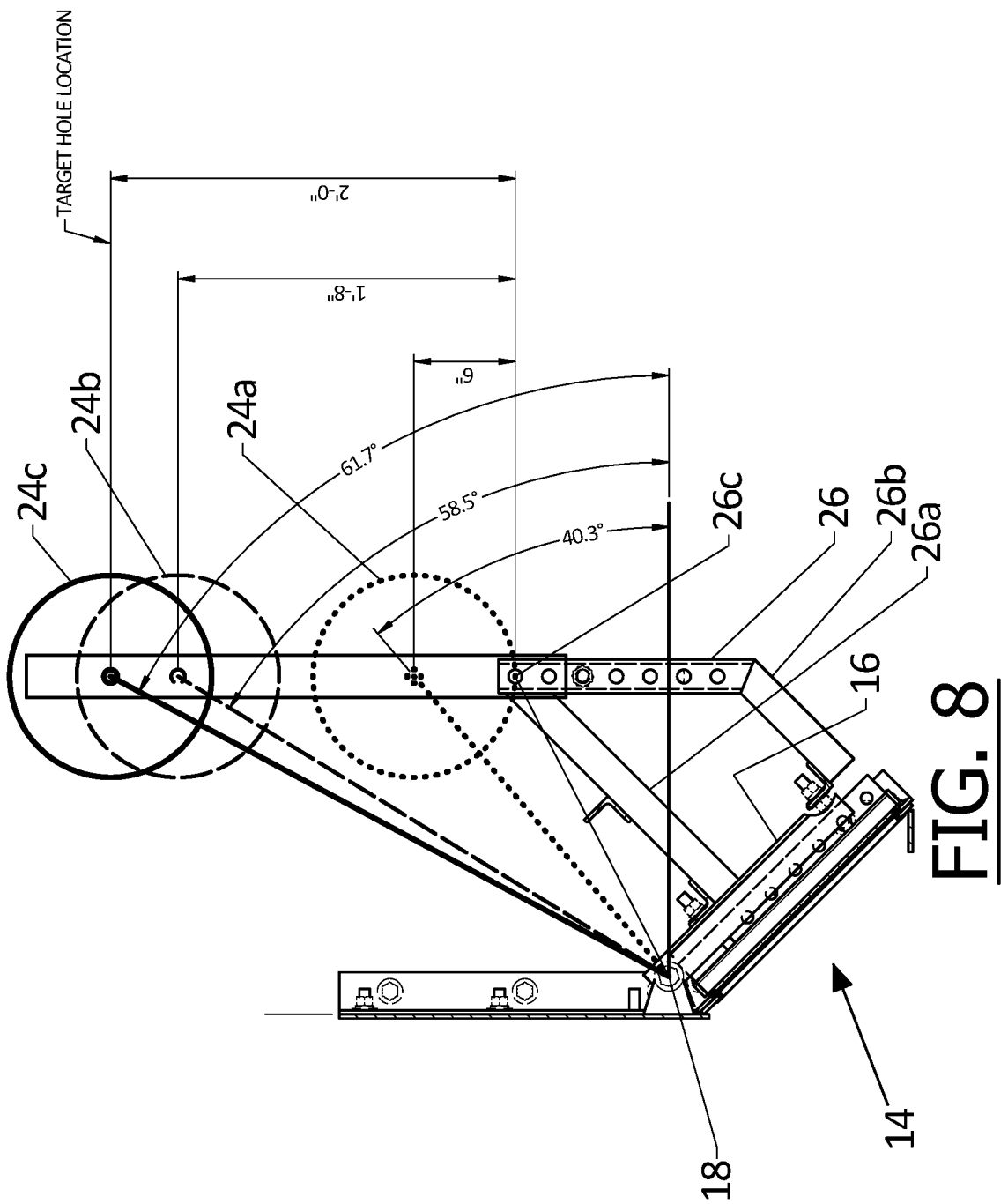
FIG. 8 is a side schematic view indicating different heights of a counterweight acting on the flap gate.

FIG. 8 is a schematic side view showing different design positions of the counterweight 24a, at three different height positions as secured to the gate flap 16. Different heights of the weight of the support arm 26 were investigated in order to find an ideal height, as measured above a point 26c, in this case a junction of the support arm 26 and the strut 26a. For simplicity the positions of the weight, denoted as 24a, 24b and 24c, were all in vertical alignment, such that at the closed position of the flap the force of the counterweight is always acting with the same initial closure force due to the same horizontal distance from hinge 18 (creating the same initial moment) allowing for the height comparison to be done without adjusting the starting counterweight amount. The counterweight heights investigated were 6", 20" and 24" above the point 26c. Higher positions of the weight will produce greater reductions in closing moment as the flap 16 opens. As can be envisioned, a very high position of the weight 24, e.g. five or six or more feet above the point 26c, would produce an unstable gate control, one which would cause the gate to open fully once the flap was open just a few degrees. The gate would "flip", or flush out the liquid as soon as the weight is angled back far enough, and in the extreme case the weight would be positioned beyond the hinge 18 and thus the flap gate would not return to closure even if no hydraulic head remains behind it.

The tests were conducted with a three foot wide gate design, with 291 pounds of counterweight. In these tests the counterweight amounted to approximately 90% of the total weight acting on the flap. The objective was to find the optimal position of the counterweight to achieve minimum rise in the basin, with a particular headloss inducing device between the basin and the gate. Note that for greater headloss in an intermediate headloss device the counterweight arm height generally must be greater, and vice versa. Adjustments can also be made in the horizontal direction, with different effect.

At the six inch high position 24a of the counterweight, the maximum flow rate produced through the gate was 3022 gpm, at a liquid level increase in the basin of nine inches at maximum flow rate. The basin rise actually could have been greater, but in this particular test nine inches brought the liquid up to overflow level in the basin.

The second position tested was at 24b, 20" above the point 26c. The maximum flow rate produced through the gate was 7203 gpm, with a basin liquid level increase of 6.5 inches.

The third position at 24c had the counterweight 24" above the point 26c. The maximum flow rate produced through the system was 7211 gpm, and at this maximum flow the basin level rise was approximately five inches. This was found optimum in the tests conducted, with higher counterweight positions tending toward instability and causing the system to flush.

Another test was conducted on a counterweighted gate as in FIGS. 1 through 6, but with the intermediate headloss device removed. The flap gate 14 was positioned directly against the basin liquid. As above, the gate was acted on by selected closing moment such that it would only open if the basin level increased above design level. It was found that with a basin level rise of no more than two inches, the system flushed, not returning toward closure in a way to control the outflow. The system of the invention works successfully only with the presence of an intermediate headloss device immediately upstream of the gate.

Figure 9:
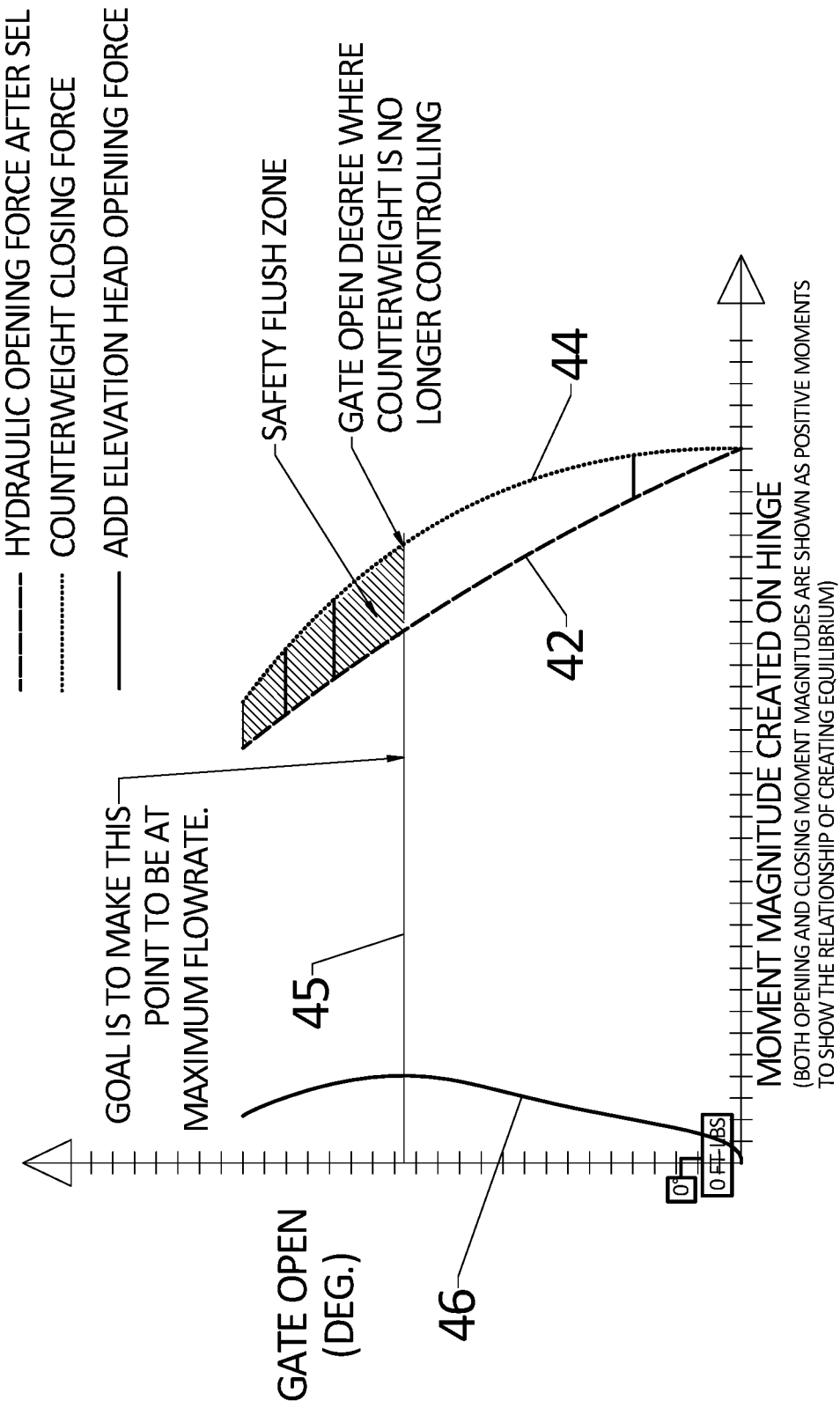
FIG. 9 is a graph indicating moments acting at the flap gate hinge as the gate opens.

FIG. 9 demonstrates the functional relationship between opening forces on the gate and closing forces on the gate. The X-axis represents magnitude of moment acting on the gate flap, with the dashed line 42 indicating hydraulic opening force on the gate flap just downstream of the SEL, and resulting amount of gate opening (in degrees). This opening force is the entire force exerted by the liquid, including when moving. As illustrated, the further the gate is open, the less hydraulic opening force is acting on the gate.

The dotted line 44 represents closing force exerted by the counterweight. This would actually be opposite in sign to the moment exerted by the hydraulic opening force, but the two are both presented as positive in this graph in order to more easily show the difference of moments at various positions of the gate. The graph demonstrates that when the flap is closed (gate opening at zero), the hydraulic opening force as well as the counterweight closing force are both at maximum, and are equal (and opposite). Note that line 42 decreases in moment magnitude at a faster rate than line 44. This is intentional because once line 44 starts to decrease in moment magnitude faster than line 42 the counterweight is no longer controlling the system and the gate will flip to fully open and no longer return back to closed until the tank/basin is drained or the gate is reset. This condition is shown in the "safety flush zone", above the design maximum flow rate indicated by the line 45 in FIG. 9.

At the gate opening level 45, as well as below that line, the counterweight closing force or moment is shown to be greater than the hydraulic opening force, which acts in the opposite direction. Thus, the right side of the graph of FIG. 9 does not itself show a condition of equilibrium on the gate. The difference in moment is indicated at the left of FIG. 9, and this difference to equilibrium is made up by the rising level of the liquid in the basin (see FIGS. 1-3).

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A control system to control liquid level in an upstream basin without electrical components, the control system including the upstream basin and a midstream headloss inducing device that creates a non-linear relationship between the upstream basin's liquid level to be controlled and a lesser downstream liquid level, the control system further comprising:
    a gate at an exit of the midstream headloss inducing device, with closure means urging the gate toward closure,
    the gate being a flap gate, with a flap movable on a horizontal hinge axis, which is below the liquid level of the upstream basin,
    the closure means including a counterweight connected to the gate and urging the gate toward closure during flap travel of the gate, the counterweight being supported above the gate flap by an arm fixed to and extending generally upwardly from the gate flap such that the counterweight changes position with varying horizontal distance from the hinge of the flap as the gate opens, so that closing moment imposed by the counterweight is greatest near flap closure and becomes less as the gate opens farther, the counterweight continuing to exert closing force after the gate opens and moves toward a fully open position,
    such that the gate tends to reach a point of equilibrium of gate opening and closing forces while liquid flows out of the basin through the headloss inducing device and then through the gate, for smooth transitions of flow out of the gate, whereby liquid level changes in the basin are minimized, without sudden surges out the gate and without sudden closures of the gate.

2. The control system of claim 1, wherein the assembly of the gate flap, arm and weight have a center of gravity higher than the flap, and wherein the center of gravity is responsive to an angle of opening of the gate flap such as to move the center of gravity toward a vertical plane containing the flap hinge.

3. The control system of claim 1, wherein the midstream headloss inducing device comprises a submerged effluent launder in a clarifier of a wastewater treatment basin.

4. The control system of claim 1, wherein the liquid level changes in the basin are limited by the system to no greater than 5 inches.

5. The control system of claim 1, wherein the counterweight is fixed in position relative to the gate flap.

6. The control system of claim 1, further including a dampener connected to the flap of the flap gate to suppress undulation of the flap as liquid is discharged through the gate.

7. The control system of claim 6, wherein the dampener comprises a slidable weight on a fixed rod or shaft, the weight being mechanically connected to the flap of the flap gate so as to cause the weight to slide generally horizontally on the rod or shaft as the flap moves in an opening or a closing position.

8. The control system of claim 6, wherein the dampener comprises a weight slidable on a fixed rod or shaft, the weight being mechanically connected to the arm so as to cause the weight to slide generally horizontally on the rod or shaft as the gate flap moves in an opening or a closing position.

* * * * *